United States Patent
Paul et al.

(10) Patent No.: US 6,749,874 B2
(45) Date of Patent: Jun. 15, 2004

(54) PAN SPRAY FORMULATION AND DELIVERY SYSTEM

(76) Inventors: Leonard Paul, 13 Stuart Dr., Bloomfield, CT (US) 06002; Edwin L Stoltz, 5716 Willow Creek La., Delray Beach, FL (US) 33484

(*) Notice: Subject to any disclaimer, the term of this patent is extended or adjusted under 35 U.S.C. 154(b) by 0 days.

(21) Appl. No.: 10/333,573

(22) PCT Filed: Aug. 13, 2001

(86) PCT No.: PCT/US01/25217

§ 371 (c)(1),
(2), (4) Date: Jan. 21, 2003

(87) PCT Pub. No.: WO02/13623

PCT Pub. Date: Feb. 21, 2002

(65) Prior Publication Data

US 2003/0211222 A1 Nov. 13, 2003

Related U.S. Application Data

(60) Provisional application No. 60/225,461, filed on Aug. 15, 2000.

(51) Int. Cl.[7] .............................................. A23D 7/005
(52) U.S. Cl. ....................... 426/115; 426/609; 426/811; 106/243
(58) Field of Search ................................ 426/115, 116, 426/609, 811, 662; 106/243

(56) References Cited

U.S. PATENT DOCUMENTS

| | | | | | |
|---|---|---|---|---|---|
| 4,163,676 A | * | 8/1979 | Konigsbacher | ............ | 106/243 |
| 4,188,412 A | * | 2/1980 | Sejpal | ............ | 426/609 |
| 5,374,434 A | * | 12/1994 | Clapp et al. | ............ | 426/116 |
| 5,567,456 A | * | 10/1996 | Clapp et al. | ............ | 426/116 |
| 6,113,970 A | * | 9/2000 | Rainey | ............ | 426/601 |
| 6,140,519 A | * | 10/2000 | Hutton et al. | ............ | 554/83 |
| 6,210,743 B1 | * | 4/2001 | Clapp et al. | ............ | 426/662 |
| 6,613,376 B2 | * | 9/2003 | Smith et al. | ............ | 426/609 |

* cited by examiner

*Primary Examiner*—Carolyn Paden
(74) *Attorney, Agent, or Firm*—Melvin I. Stoltz

(57) ABSTRACT

By combining water, lecithin, and oil as the three principal ingredients, a highly effective, uniform, widely dispersed, pan release spray product is achieved with the lecithin comprising a de-oiled powdered lecithin. The de-oiled, powdered lecithin is water miscible and is blended with relatively high percentages of water and vegetable oil to form an oil in water stable emulsion that exhibits superior pan release properties. Furthermore, the oil in water emulsion of the present invention is easily formulated with a variety of blending agents to make flavorful salad dressing, marinades, and pet flavor enhancing products, as a non-aerosol, finger pump based product or as an aerosol product.

18 Claims, No Drawings

PAN SPRAY FORMULATION AND DELIVERY SYSTEM

This application is a 371 of PCT/US01/25217, filed Aug. 13, 2001 and claims the benefit of U.S. provisional application No. 60/225461, filed Aug. 15, 2000.

TECHNICAL FIELD

This invention relates to uniform spray dispersion products and systems for oil and water based products, and more particularly, to dispersion systems for obtaining a wide, uniform spray of oil and water based products for food-related use.

BACKGROUND ART

During the last several years, substantial attention has been paid to food related products in general, and the cooking industry in particular. In this regard, substantial attention has been devoted to products used to coat surfaces of cooking utensils, such as for baking, frying, sauteing, etc. In this regard, substantial attention has been paid in an attempt to develop a product capable of meeting consumer demand for a healthy, low calorie product which is also capable of providing wide, uniformly dispersed spray coating on the surface being employed.

Typically, the surface of the cooking pot, pan, utensil, grill, etc. is manually coated with a release agent or sprayed with a release agent contained in a squeeze bottle, low pressure finger actuated pump, or aerosol container. However, the use of these prior art products typically results in the release agent being dispensed in discontinuous, non-uniform "spits" of product, or in dribbles of product. As a result, a raw, uneven spray pattern is typically achieved, which has caused these products to be commercially unacceptable.

In addition, the formulations of these pan release sprays often incorporate ingredients which health oriented consumers wish to avoid. Consequently, many of these release products are not employed by such consumers due to their perceived deleterious health effects.

One product which has successfully overcome many of the major objections found in the prior art is taught in Stoltz U.S. Pat. Nos. 5,455,055 and 5,650,185. In the disclosure found in these patents, a non-aqueous, vegetable oil, liquid lecithin and ethanol composition is taught which is dispensed from a unique non-aerosol type container, achieving a cooking spray with substantially enhanced release properties as well as spray characteristics. However, in spite of the commercial success of this product in its ability to overcome many of the prior art difficulties, the caloric level of this product has not satisfied all health conscious individuals.

In the formulation employed in these prior art patents, as well as in numerous other prior art disclosures, lecithin is employed as a principal ingredient. The use of lecithin is well known and widely employed in a variety of products for varying purposes. Lecithin which occurs in just about all living cells is a natural phospholipid. Lecithin has been used for years as a lipophilic (fat or oil loving) emulsifying agent. In the trade lecithin is classified as an oil in water (O/W) emulsifier. The role of lecithin has changed in recent years due to many chemical modifications to become more useful to industry as dispersion and wetting agents, and lubricants, as well as their enate emulsifying properties. The source for commercial lecithin in its may forms is the soybean.

Lecithin is a complex mixture of insoluble phospholipids consisting of phosphatidycholine (PC), phosphatidylethanolamine (PE), phosphatidylinositol (PI), and phosphatidic acid (PA) combined with other triglycerides. Whereas, the fluid or liquid lecithins contain almost 40% triglycerides, new de-oiled, powder lecithins has been developed which contain an average of only 3% triglycerides. With the triglycerides or oily portion of lecithin removed, the percentage of glycolipids, PC, PE, PI and PA have increased in the de-oiled powder lecithin to render them water dispersible.

Historically, lecithins were predominately thick liquids having an amber to dark brown color. Liquid lecithin is not soluble or even dispersible in water. However, lecithins have undergone considerable chemical changes to be now commercially available as a dry, free-flowing powder and above all to be easily dispersed in water.

Lecithin has become a common chemical commodity that has been used in different industries as an emulsifying agent, for example. Lecithin is used in baked goods, sauces, marinades, instant drink mixes, snack foods, chewing gum and as a cooking spray pan release agent. Lecithin is used in a variety of personal products such as skin lotions, lipstick or even health foods for its choline amino acid content. In the present invention, lecithins surface active properties acts as a highly effective pan release agent.

In spite of the extensive use that has been made of lecithin in numerous prior art products, no pan release formulation has been developed which is capable of satisfying all of the consumer demands for a universally acceptable pan release spray product and delivery system. However, the present invention has been capable of meeting this demand and long felt need.

DETAILED DISCLOSURE

By employing the present invention, all of the prior art difficulties and drawbacks have been overcome, and a pan release spray formulation and delivery system has been realized which is capable of providing a wide, uniform, dispersed spray pattern using a formulation which is water-based, thereby substantially reducing the caloric level of the composition. In attaining this composition and formulation, a unique combination of ingredients has been developed.

In accordance with the present invention, a highly effective, uniform, widely dispersed, pan release spray product is achieved by combining water, lecithin, and oil as the three principal ingredients. Preferably, between about 30% and 60% by weight based upon the weight of the entire composition comprises water, while between about 40% and 60% by weight based upon the weight of the entire composition comprises oil. Completing the formulation is lecithin, which comprises between about 2% and 12% by weight based upon the weight of the entire composition.

Although the combination of these quantities of water and oil is typically avoided in most formulation, due to the inability of oil and water to be intermixed with each other, in the present invention, it has been discovered that the oil and water combination along with the lecithin produces a substantially uniform stable emulsion. In the composition of the present invention, all of the ingredients remain fully dispersed with each other, even after long periods of storage. Consequently, in spite of the contrary teaching found in the prior art, the present invention has found that this combination of ingredients produces a unique formulation, capable of achieving results previously believed to be unattainable.

One of the principal ingredients incorporated into the pan release formulation of the present invention is a newly developed, de-oiled, powdered lecithin. As detailed herein, the de-oiled, powdered lecithin is water miscible and, in accordance with this invention, is blended with relatively high percentages of water and vegetable oil to form an oil in water stable emulsion that exhibits superior pan release properties, as compared to the liquid lecithin type product.

The oil in water emulsion of the present invention is also easily formulated with a variety of blending agents to make flavorful salad dressings, marinades, and pet flavor enhancing products, as a non-aerosol, finger pump based product or as an aerosol product. Furthermore, the use of relatively high concentrations of water in these new no-stick cooking sprays, substantially reduces the caloric levels, as compared to oil-based, non-aqueous products. In this way, a principal requirement of the consuming public is satisfied.

One important characteristic of the new, de-oiled, powered lecithin is its HLB (Hydrophilic to Lipophilic Balance) value. The HLB value or scale was developed many years ago to measure the relative solubility of surface active agents in water and oil. The HLB scale ranges from 0–15 indicating oil solubility at the lower end and water solubility at the high end of the scale.

The HLB value for liquid lecithin is 4.0 (Lipophilic), while the new, de-oiled powder lecithins range from 8.0 to 10.0 (more hydrophilic). At this level, these lecithins can be classified as water dispersible. The HLB value of dry lecithin now allows one to utilize a large percentage of water, that was not possible with the other liquid lecithin, together with vegetable oil and other blending agents to form a stable oil in water emulsion.

From an economic standpoint, the use of water, vegetable oil and dry lecithin plus the necessary blending agents insures a lower manufacturing cost over the non-aqueous oil based products. In these formulations using dry lecithin allows us to replace a good portion of a vegetable oil, such as canola, soybean, corn, olive, peanut, safflower, etc., with de-ionized water that results in a lower manufacturing cost.

There are several dry, powder lecithins to chose from depending upon its chemical properties useful to the end product produced. These dry lecithin products are produced by Central Soya Company, Ft. Wayne, Ind., and marketed as Precept™ Lecithins. Central Soya produces dry hydroxlated lecithins as Precept # 8120 that has a HLB value of 10.0. Precept # 8120 has good emulsion stability and is the most hydrophilic of the powder lecithins. Dry enzyme modified lecithin treated with phospholipase enzyme, gives Precept # 8160 a HLB value of 9.0 and good water dispersibility. Another Precept lecithin is # 8140 with a HLB value of 8.0, which resists darkening upon heating, has a faint bland taste, and is preferred for use as a pan release and/or cooking spray products. Although Precept # 8140 is preferred, all of the Precept products may be employed in pan released and/or cooking spray products.

Typical pan release products found in the prior art contains 2.0 to 8.0% liquid lecithin in a vegetable oil base. For optimum use, we have found that 2.8 to 3.0% liquid lecithin in either an aerosol or non-aerosol formulation is an acceptable pan release agent as detailed in the Stoltz patents described above. In the present invention, cooking spray with pan release properties, using a combination of a vegetable oil in a water base, generally requires from 2.0% to 12% by weight based upon the weight of the entire composition of dry powder lecithin, with a preferred range being between about 3.0% and 9.0% by weight based upon the weight of the entire composition. As shown below in the following examples, wherein formulations for both pressurized aerosol and non-aerosol pump type pan release sprays are fully detailed, a range of between 4.0% and 8.0% by weight based upon the weight of the entire composition of dry lecithin is optional for providing superior pan release properties over the conventional liquid lecithin based products.

To illustrate our surprising pan release results, the following aerosol and non-aerosol formulations are provided:

EXAMPLE #1

Pressurized Aerosol Type

| Ingredients | %/Wgt. |
|---|---|
| Concentrate: | |
| De-ionized Water | 40.0 |
| Powdered Soy Lecithin* | 6.0 |
| Canola Oil (Or other oil) | 53.4 |
| Potassium Sorbate, USP/NF** | 0.3 |
| Sodium Benzoate, USP/NF** | 0.2 |
| Vitamin E*** | 0.1 |
| Total: | 100.0 |
| Aerosol Fill: | |
| Concentrate | 85.00 |
| Propellant**** | 15.00 |
| Total: | 100.00 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry The pressurized no stick or pan release cooking spray in Example #1 deposited a white foam over the pan surface. We found that as the cooking progressed that the foam dissipated quickly. However, the pan release properties remained for the duration of the cooking cycle.

EXAMPLE #2

High Pressure Finger Pump

| Ingredient | %/Wgt. |
|---|---|
| De-ionized Water | 53.4 |
| Powdered Soy Lecithin* | 6.0 |
| Vegetable Oil | 40.0 |
| Potassium Sorbate, USP/NF** | 0.3 |
| Sodium Benzoate, USP/NF** | 0.2 |
| Vitamin E*** | 0.1 |
| Total: | 100.0 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry In the formulation defined as Example #2 a high pressure, finger actuated pump was used which resulted in excellent pan release properties. The presence of the white foamy particles was not a distracting factor. We found that when grilling steaks, that the meat slid easily over the treated metal grill with no sticking, even after turning the meat over several times.

The true essence of this invention concerns the dual nature of the concentrate due to its main or active ingredient, namely powdered and de-oiled soy lecithin. We have been surprised, that this invention based on the formulations shown here with high levels of water, could be made as both a pressurized aerosol and also a pump actuated non-aerosol product.

We consistently made good, highly acceptable no stick aerosol cooking sprays with the powdered lecithin ranging between about 2.0% and 12.0% by weight based upon the weight of the entire composition. The fact that the aerosol generated spray products resulted in a white, frothy deposit on the cooking surface did not detract from its pan release properties. In fact, we employed the frothy deposit as an indicator of the spray product coverage over the cooking surface. We found that a quick burst of the white emulsion was all that was required for excellent non stick properties.

On the other hand, the non-aerosol product reacted in a different manner. We found that with the lower percentages of 2.0%, 3.0% and even 4.0% powdered lecithin, that the spray pattern resulted in a "donut" effect, or a spray pattern which resembled the letter "O". The spray product ringed the circumference of the pan, however there was little or no product in the middle. From a commercial viewpoint, the "O" spray pattern is not acceptable. A good spray must provide a concentrated, evenly dispersed pattern in a concentric ring. However, to our great surprise, we discovered that the non-aerosol spray pattern filled in as the percentage of powdered lecithin was increased.

EXAMPLE #3

Pressurized Aerosol Type

| Ingredients | %/Wgt. |
|---|---|
| Concentrate: | |
| De-ionized Water | 30.0 |
| Powdered Lecithin* | 4.0 |
| Corn Oil | 65.6 |
| Potassium Sorbate, USP/NF** | 0.3 |
| Sodium Benzoate, USP/NF** | 0.2 |
| Vitamin E*** | 0.1 |
| Total: | 100.0 |
| Aerosol Fill: | |
| Concentrate | 83.0 |
| Propellant**** | 17.0 |
| Total: | 100.0 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry Example #3 with only 4% powdered lecithin was found to be an acceptable commercial product. The moderate amount of white coating resulted in excellent pan release properties. The cooked foods tested ranged from eggs, meat and fish. There was no odor or residue adhering to the cooked foods.

EXAMPLE #4

High Pressure Finger Pump

| Ingredients | %/Wgt. |
|---|---|
| De-ionized Water | 49.4 |
| Powdered Soy Lecithin* | 10.0 |
| Vegetable Oil | 40.0 |
| Potassium Sorbate, USP/NF** | 0.3 |
| Sodium Benzoate, USP/NF** | 0.2 |
| Vitamin E*** | 0.1 |
| Total: | 100.0 |

Notes:
*Refers to Precepts Powdered Lecithin, a product of Central Soya Co., Inc. Ft. Wayne, IN.
**Antifungal & Antibacterial preservatives
***An antioxidant
****Propellant comprising one or more selected from the group consisting of hydrocarbon blends (A31 or A46), DME, plus other propellants known in the industry In Example 4, we employed a relatively high percentage of powered lecithin combined with water and oil. In this formulation, we found that while the oil in water emulsion is thick the product sprays well and especially fills in the spray pattern with widely dispersed particles. In general, non-aerosol formulations with powdered lecithin over 6.0% produced similar spray patterns. This formulation resulted in the same excellent no stick properties as the other formulations shown above.

In this disclosure, we commonly describe the products as "No Stick Cooking Spray" or "Pan Release Cooking Spray". Both of these terms are used interchangeable, referring to the same type product.

We have noted above that the non-aerosol pump type formulations resulted in a donut or "O" spray pattern. This effect was eliminated with increased percentages of the powdered lecithin. However, this can be a concern for commercial products since the cost of the powdered lecithin is a big factor. However, we also discovered, to our great surprise, that the method of incorporating or compounding the product had a direct relationship to the resulting spray pattern.

We found that if the powdered lecithin was first mixed into the oil and then the water, the spray patterns tended to end up as empty circles. However, if the powdered lecithin was first mixed into the water and then the oil, the resulting sprays patterns tended to be more evenly dispersed. For this important reason, and not to mislead users of the information included here, we always list the ingredients in the preferred order of addition.

Since the order of ingredient incorporation is important for both aerosol and non-aerosol type products, we describe the batch compounding process as follows:

1. Add the de-ionized, preferably UV treated, water to a stainless steel, sanitized, scale mounted batch tank equipped with serrated shearing mixing blades.
2. When the water is well above the serrated mixing blades, start the mixer at a moderate speed. Avoid any splashing or aeration.
3. Slowly sift in the required amount of powdered lecithin making sure there are no clumps. We found that the powdered lecithin requires all clumps to be broken down to a smooth, uniform powder. This is especially true since powdered lecithin is very hygroscopic and really picks up moisture from the atmosphere, thereby forming clumps.

4. Once all the de-ionized water and powdered lecithin are in the batch tank, the mixing speed is increased to break up any clumps and wet the powder as it combines with the water. The batch at this time is being mixed until all the powdered lecithin is finely dispersed in the water phase and no particles or clumps are visible.

5. The oil is now added slowly that produces a creamy, smooth emulsion. At this point, with the shearing action of the mixer, we find that the powdered lecithin goes into a colloidal emulsified stable state, more readily than in the dispersed initial water phase. The time and effort to batch in the manner shown above, proves beneficial at a later stage when the final product has to be sprayed.

6. The three final ingredients are added in order to complete the batched product.

We have also discovered that the non-aerosol, pan release, spray formulations of the present invention can be distributed in reusable or refillable containers, thereby further enhancing the cost savings properties of the present invention. In this regard, the high pressure finger pump employed to dispense the pan release product of the present invention may be mounted to a container having a threaded collar, thereby allowing the finger actuated pump to be threadedly mounted to the product holding container.

As a result, whenever the product has been consumed, the pump is merely removed from the container and the container is refilled from a newly purchased product only holding container. In this way, a consumer is able to purchase the non-aerosol, pan release, spray formulation of this invention in a container which does not include the expensive high pressure, finger actuated pump attached thereto. As a result, a substantially reduced cost would be incurred when purchasing only the product formulation, and a substantial savings benefits would result to the consumer.

In addition, we have also found that the non-aerosol, pan release spray formulations of the present invention may also be employed by merely pouring the product directly into a pan for use. As a result, a refillable, threaded container can provide a dual function. In this regard, the finger actuated pump attached to a threaded container can be employed to spraying the product onto the pan or, if desired, the pump can be removed from the container and the pan release product poured into the skillet. In this way, the consumer is able to enjoy complete control over the precise manner in which the product is dispensed.

Finally, we have also discovered that the pourable pan release spray formulation of the present invention may also be employed as a salad oil base for use with any desired flavorings. In this regard, a desired quantity of the pan release spray product is poured into a container and then mixed with any desired salad dressing mix or flavorings. In this way, a highly desirable salad dressing is realized.

Furthermore, if desired, a specially created salad dressing mixing composition can be formulated, with the composition incorporating vinegar for further enhancing the taste of any resulting salad dressing. However, as detailed above, the pan release product itself can be employed, with vinegar being added, if desired, along with the suitable salad dressing flavorings.

It will thus be seen that the objects set forth above, among those made apparent from the proceeding description, are efficiently attained and, since certain changes may be made in carrying out the above process and in the composition set forth without departing from the scope of the invention, it is intended that all matter contained in the foregoing description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

Having described our invention, what we claim as new and desire to secure by Letter Patent is:

What is claimed is:

1. A pan release spray product for use in food preparation which provides a consistent, uniform, widely dispersed spray pattern comprising:
    A. between about 30% and 60% by weight based upon the weight of the entire composition of water;
    B. between about 40% and 60% by weight based upon the weight of the entire composition of oil; and
    C. between about 2% and 12% by weight based upon the weight of the entire composition of de-oil, powdered lecithin;

whereby a highly efficient and effective food-oriented spray product is achieved which is dispensed consistently and repeatedly in a wide, uniformly dispersed spray pattern.

2. The pan release spray product defined in claim 1, wherein said ingredients forming the composition are retained in a product delivery container comprising one selected from the group consisting of aerosol containers and non-aerosol, finger-pump actuated containers.

3. The pan release spray product defined in claim 1, wherein said de-oil, powdered lecithin is further defined as comprising an HLB value ranging between about 8 and 10.

4. The pan release spray product defined in claim 3, wherein said oil is a vegetable oil comprising at least one oil selected from the group consisting of canola, soybean, corn, olive, peanut, and safflower.

5. The pan release spray product defined in claim 4, wherein said lecithin is further defined as comprising between about 3% and 9% by weight based upon the weight of the entire composition.

6. The pan release spray product defined in claim 5, wherein said composition is further defined as comprising one or more additives selected from the group consisting of vitamins, antioxidants, anti-fungal compositions and anti-bacterial compositions.

7. The pan release spray product defined in claim 1, wherein said composition is further defined as comprising:
    D. between about 0.05% and 0.5% by weight based upon the weight of the entire composition of potassium sorbate;
    E. between about 0.05% and 0.5% by weight based upon the weight of the entire composition of sodium benzoate; and
    F. between about 0.05% and 0.5% by weight based upon the weight of the entire composition of vitamin E.

8. A pan release spray product and delivery system for use in food preparation which provides a consistent, uniform, widely dispersed spray pattern comprising:
    A. a non-aerosol, finger pump actuated container; and
    B. a pan release spray composition retained in said container and comprising:
        a. between about 30% and 60% by weight based upon the weight of the entire composition of water;

b. between about 40% and 60% by weight based upon the weight of the entire composition of oil; and c. between about 2% and 12% by weight based upon the weight of the entire composition of de-oil, powdered lecithin;

whereby a pan release spray product and delivery system is achieved which is highly efficient and dispenses the spray product repeatedly and consistently in a wide, uniformly dispersed spray pattern.

9. The pan release spray product defined in claim 8, wherein the spray composition is formed by mixing the powdered lecithin into the water prior to intermixing the oil, whereby a uniform spray pattern is produced.

10. The pan release spray product defined in claim 9, wherein said lecithin is further defined as comprising between about 3% and 9% by weight based upon the weight of the entire composition.

11. The pan release spray product defined in claim 10, wherein said lecithin is further defined as comprising an HLB value ranging between about 8 and 10.

12. The pan release spray product defined in claim 11, wherein said water comprises deionized, UV treated water, and the oil is a vegetable oil comprising one selected from the group consisting of canola, soybean, corn, olive, peanut, and safflower.

13. The pan release spray product defined in claim 12, wherein said composition is further defined as comprising one or more additives selected from the group consisting of vitamins, antioxidants, anti-fungal compositions, and anti-bacterial compositions.

14. A process for manufacturing a pan release spray composition comprising the steps of:

A. adding between about 30% and 60% by weight based upon the weight of the entire composition of water to a batch tank equipped with blades for mixing;

B. initiating movement of the mixing blades;

C. slowly sifting between about 2% and 12% by weight based upon the weight of the entire composition of de-oil, powdered lecithin into the water containing batch tank;

D. thoroughly intermixing the lecithin and water until a uniform composition is attained with the lecithin thoroughly dispersed in the water; and E. intermixing between about 40% and 60% by weight based upon the weight of the entire composition of oil into the batch tank until a creamy, smooth emulsion is attained.

15. The process defined in claim 14, wherein the oil is added to the water and lecithin mixture by slowly adding the oil to the batch tank.

16. The process defined in claim 15, wherein the oil is a vegetable oil comprising one selected from the group consisting of canola, soybean, corn, olive, peanut, and safflower.

17. The process defined in claim 14, comprising the additional step of intermixing into the composition at least one additive selected from the group consisting of vitamins, antioxidant, antibacterial compositions and anti-fungal compositions.

18. The process defined in claim 17, comprising the additional steps of:

F. mixing into the composition between about 0.05% and 0.5% by weight based upon the weight of the entire composition of potassium sorbate;

G. mixing into the composition between about 0.05% and 0.5% by weight based upon the weight of the entire composition of sodium benzoate; and H. mixing into the composition between about 0.05% and 0.5% by weight based upon the weight of the entire composition of vitamin E.

* * * * *